United States Patent
Gadi et al.

(10) Patent No.: US 11,275,647 B2
(45) Date of Patent: Mar. 15, 2022

(54) SYSTEM AND METHOD FOR SOLVING AN ISSUE IN AN INFORMATION TECHNOLOGY (IT) INFRASTRUCTURE

(71) Applicant: ZENSAR TECHNOLOGIES LIMITED, Maharashtra (IN)

(72) Inventors: Sridhar Gadi, Maharashtra (IN); Pavan Jakati, Maharashtra (IN); Manish Kumar, Maharashtra (IN)

(73) Assignee: Zensar Technologies Limited, Pune (IN)

( * ) Notice: Subject to any disclaimer, the term of this patent is extended or adjusted under 35 U.S.C. 154(b) by 0 days.

(21) Appl. No.: 16/905,316

(22) Filed: Jun. 18, 2020

(65) Prior Publication Data

US 2021/0303389 A1 Sep. 30, 2021

(30) Foreign Application Priority Data

Mar. 31, 2020 (IN) .............................. 202021014470

(51) Int. Cl.
  *G06F 11/00* (2006.01)
  *G06F 11/07* (2006.01)
  *G06N 3/04* (2006.01)
  *G06N 3/08* (2006.01)

(52) U.S. Cl.
  CPC ...... *G06F 11/0793* (2013.01); *G06F 11/0709* (2013.01); *G06F 11/0751* (2013.01); *G06F 11/0787* (2013.01); *G06N 3/0445* (2013.01); *G06N 3/08* (2013.01)

(58) Field of Classification Search
  CPC ............ G06F 11/0793; G06F 11/0709; G06F 11/0751; G06F 11/0787; G06F 11/0706
  See application file for complete search history.

(56) References Cited

U.S. PATENT DOCUMENTS

| | | |
|---|---|---|
| 2008/0319933 A1 | 12/2008 | Moussa et al. |
| 2017/0019315 A1 | 1/2017 | Tapia et al. |
| 2017/0353991 A1 | 12/2017 | Tapia |

OTHER PUBLICATIONS

Potharaju et al., Towards Automated Problem Inference from Network Trouble Tickets, 2013, https://www.usenix.org, 15 pages (Year: 2013).*
Xiong, Resource Optimization and Security in Distributed Computing, 2009, https://repository.lib.ncsu.edu/, 5 pages (Year: 2009).*

* cited by examiner

*Primary Examiner* — Katherine Lin
(74) *Attorney, Agent, or Firm* — Hamre, Schumann, Mueller & Larson, P. C.

(57) ABSTRACT

Methods and system for solving an issue in an infrastructure is described. The method comprises identifying (201) the issue based on monitoring of the infrastructure, extracting (203) one or more standalone solutions related to the identified issue from a repository, creating (205) one or more combination of solutions from the extracted one or more standalone solutions, computing (207) Multi Directional Truepath Discovery (MDTD) score for each of the extracted one or more solutions and each of the created combination of solutions, selecting (209) either a standalone solution or a combination of solutions based on highest MDTD score, and implementing (211) the selected standalone solution or combination of solutions.

13 Claims, 6 Drawing Sheets

SYSTEM AND METHOD FOR SOLVING AN ISSUE IN AN INFORMATION TECHNOLOGY (IT) INFRASTRUCTURE

TECHNICAL FIELD

The present disclosure relates to a technique of solving an issue in an Information Technology (IT) infrastructure.

BACKGROUND

In day to day IT operations within an infrastructure, IT support teams encounter abundance of issues (called as incidents) which are created in a system of records called IT system management (ITSM). These issues are created in system of record either manually or by integrated systems whenever an issue or problem is observed in IT infrastructure by users, support staff or systems.

Once these issues are recorded, the issues are supposed to be attended by IT support staff manually to understand and solve the issue by using resources like scripts or automation workflows or systems to fix those issues through human intervention and human intelligence.

Therefore, there exists a need in the art to provide a system which overcomes the above-mentioned problems by learning from the issue data pattern and finding a most relevant healing solution for a particular type of issue and thus brings in auto healing capability of issues which are repetitive and occurs frequently in the IT Infrastructure, thereby reducing the dependency on human intervention and human intelligence to identify right solution to an issue type.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a method of solving an issue in an Information Technology (IT) infrastructure is disclosed. The method comprises the steps of identifying the issue based on monitoring of the IT infrastructure and extracting one or more standalone solutions related to the identified issue from a repository. The method further comprises for each of the identified issue, creating one or more combination of solutions from the extracted one or more standalone solutions and computing Multi Directional Truepath Discovery (MDTD) score for each of the extracted one or more solutions and each of the created combination of solutions. The method then for each of the identified issue, selects either a standalone solution or a combination of solutions based on highest MDTD score and implements the selected standalone solution or combination of solutions.

In another non-limiting embodiment of the present disclosure, the method further comprises storing a plurality of issues along with one or more standalone solutions in the repository. The MDTD score is determined based on one or more parameters associated with each of the standalone solutions and the one or more parameters is selected from a group comprising computation resource required, accuracy level, and response time.

In yet another non-limiting embodiment of the present disclosure, the creating of the one or more combinations of solutions from the extracted one or more standalone solutions comprises creating one or more combinations of solutions from the extracted one or more standalone solutions based on highest probability of solving the issue. The method further comprises updating the repository based on the implementation of the selected standalone solution or combination of solutions. The extracting one or more standalone solutions comprises matching each of the identified issue with the plurality of issues stored in the repository, if the identified at least one issue matches with one of the plurality of issues, extracting the one or more standalone solutions mapped with the issue, and if the identified issue does not match with one of the plurality of issues, generating an alert for a system administrator.

In yet another non-limiting embodiment of the present disclosure, a system for solving an issue in an infrastructure is disclosed. The system comprises a memory and at least one processor in communication with the memory. The at least one processor is configured to identify the issue based on monitoring of the infrastructure and extract one or more standalone solutions related to the identified issue from a repository stored in the memory.

In yet another non-limiting embodiment of the present disclosure, the at least one processor then for each of the identified issue creates one or more combination of solutions from the extracted one or more standalone solutions and compute Multi Directional Truepath Discovery (MDTD) score for each of the extracted one or more solutions and each of the created combination of solutions. The at least one processor then for each of the identified issue, selects either a standalone solution or a combination of solutions based on highest MDTD score and implements the selected solution(s) on each of respective issue.

In yet another non-limiting embodiment of the present disclosure, the at least one processor is further configured to store a plurality of issues along with one or more standalone solutions in the repository. The at least one processor is configured to determine the MDTD score based on one or more parameters associated with each of the standalone solution and the one or more parameters is selected from a group comprising at least one of computation resource required, accuracy level, and response time.

In yet another non-limiting embodiment of the present disclosure, to create one or more combinations of solutions from the extracted one or more standalone solutions, the at least one processor is configured to create one or more combinations of solutions from the extracted one or more standalone solutions based on highest probability of solving the issue. The at least one processor is further configured to update the repository based on the implementation of the selected standalone solution or combination of solutions. To extract one or more standalone solutions, the at least one processor is configured to match each of the identified issue with the plurality of issues stored in the repository, if the identified issue matches with one of the plurality of issues, extract the one or more standalone solutions mapped with the issue, and if the identified issue does not match with one of the plurality of issues, generate an alert for a system administrator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying figures, in which.

It should be appreciated by those skilled in the art that any block diagram herein represents conceptual views of illustrative systems embodying the principles of the present subject matter. Similarly, it will be appreciated that any flow charts, flow diagrams and the like represent various processes which may be substantially represented in computer readable medium and executed by a computer or processor, whether or not such computer or processor is explicitly shown.

DETAILED DESCRIPTION

The terms "comprises", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
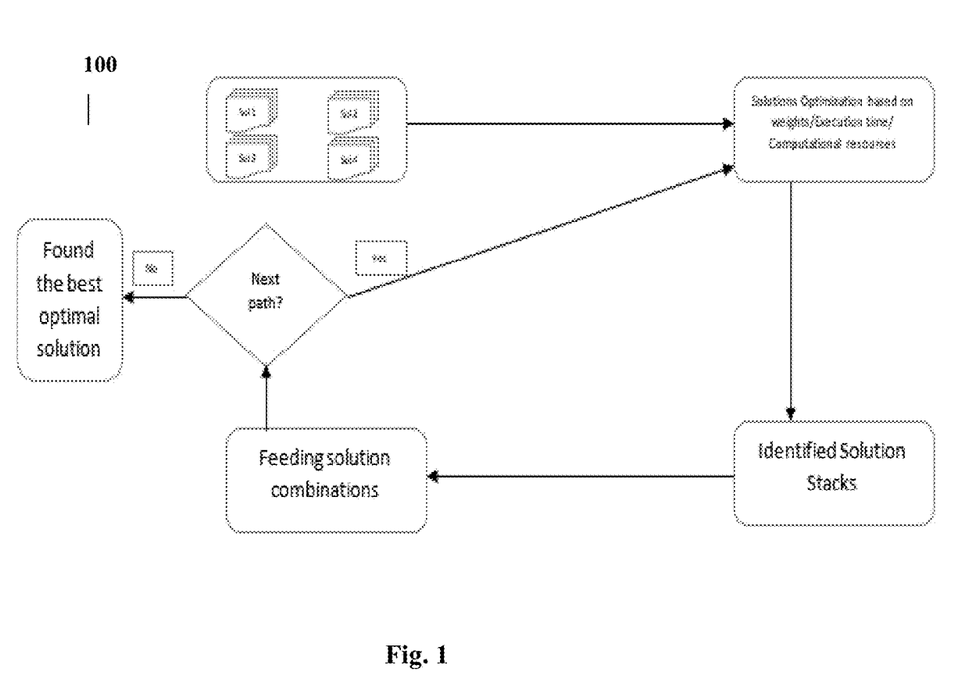
FIG. 1 shows an exemplary environment illustrating a scenario of solving an issue in an infrastructure, in accordance with an embodiment of the present disclosure.

FIG. 1 shows an exemplary environment illustrating a scenario of solving an issue in an infrastructure, in accordance with an embodiment of the present disclosure.

In one embodiment of the present disclosure, the environment 100 comprises a system (not shown) and a plurality of pre-identified issues along with one or more standalone solutions for each plurality of pre-identified issues stored in a repository of the system. Each of the one or more standalone solutions may comprise a solution script to be executed to solve a respective issue and the one or more parameters related to the previous application of each standalone solution on the respective issue. The one or more parameters may comprise accuracy level, response time, and computational resource requirement of the respective solution. The system may optimize the solutions based on the accuracy level, response or execution time, or computational resource requirement.

In one non-limiting embodiment of the present disclosure, each of the solution may comprise two types of data. First type of data comprise a solution metadata which has details about solution type, name, description, creator, time taken to execute etc. Second type of data may comprise actions steps or scripts mapped under solutions which will be run to solve the issue.

The system may encounter an issue while monitoring an infrastructure. The system may classify the encountered issue based on a particular domain. The domain may be related to IT specific domain such network management, database management, hardware management, software management, etc. However, the IT specific domains are not limited to above examples and any other domain within the IT infrastructure is well within the scope of the present disclosure.

The system may then identify or extract a solution stack or one or more standalone solutions associated with the issue based on the classification of the issue. If the solution stack is not found in the repository, the system may generate an alert for the system administrator. The system may then generate a single solution or a combination of solutions for solving the issue. The system may then compute A Multi Directional Truepath Discovery (MDTD) score for the standalone solution or combination of standalone solutions and determine the best optimum solution for the issue based on the MDTD score. Based on the determined best optimum solution, the system may update the repository of solutions for the respective issue. Determination of optimum solution refers to checking whether the standalone or combination of solutions capable of solving the problem to the maximum extent possible. Say for instance, if the prediction for an identified solution to solve the issue is 70% and there could be a combination of solutions which has higher rate of solving the problem say 80%, then this combination of solution will be preferred over the other solution. Similar check will be done for all permutation and combinations. Any solution or combinations thereof which has 100% success rate or nearing that will be chosen over the solution or combination which has lesser success rate.

Figure 2:
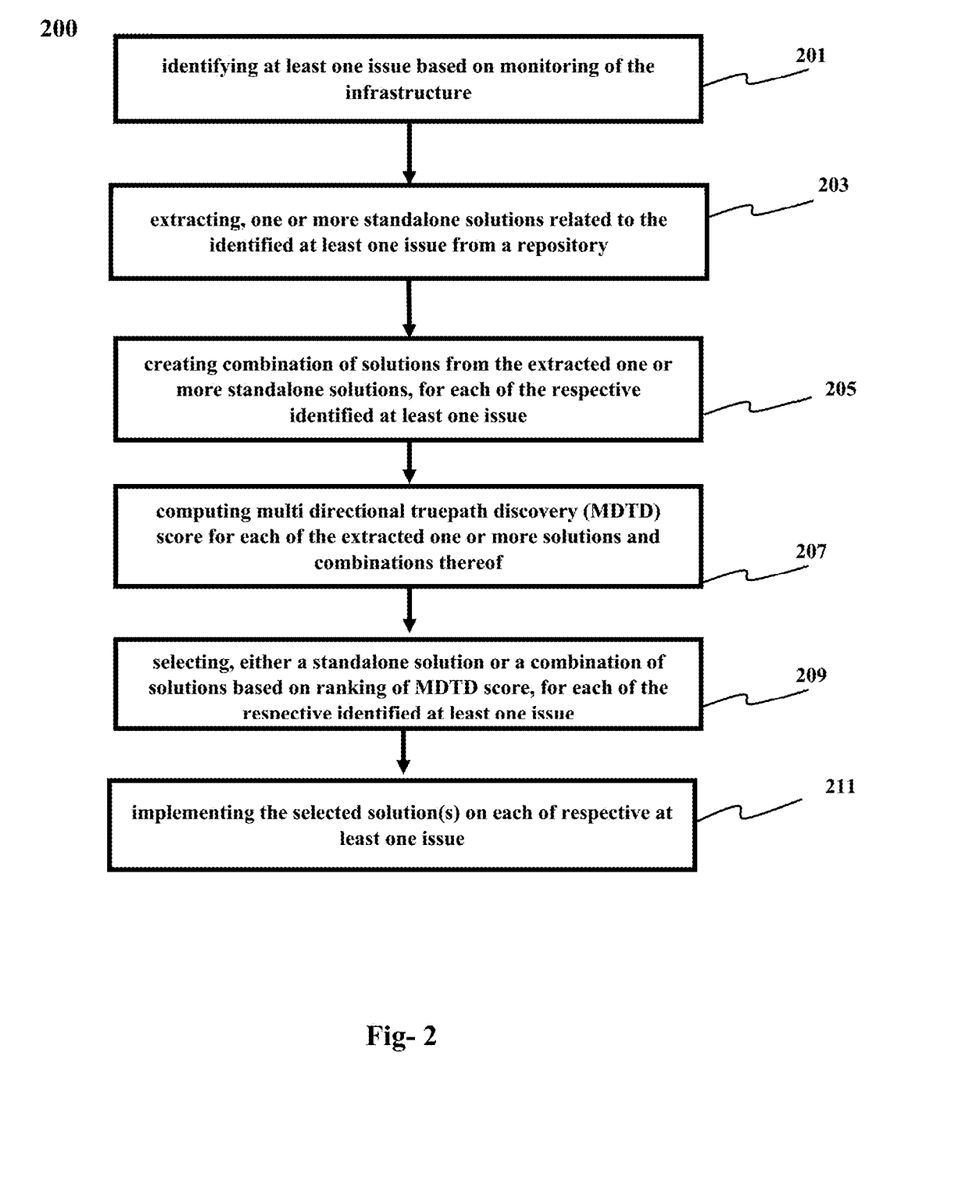
FIG. 2 shows a flow chart illustrating an exemplary method of solving an issue in an infrastructure, in accordance with an embodiment of the present disclosure.

FIG. 2 shows a flow chart illustrating an exemplary method 200 of solving an issue in an infrastructure, in accordance with an embodiment of the present disclosure.

At block 201, at least one issue may be identified by the system based on the monitoring of the infrastructure. The monitoring may comprise monitoring various elements present within an IT infrastructure. The identified at least one issue may be classified based on IT specific domains. The identified issue could be a standalone issue or a multi-level/dimensional issue or chain of issues i.e. one malfunction leading to another.

At block 203, one or more standalone solutions related to the identified at least one issue are extracted from a repository. The repository may comprise a plurality of pre-identified issues along with corresponding one or more standalone solutions for solving each of the plurality of pre-identified issues. Each of the one or more solutions may comprise a solution script to be executed to solve a respective issue or plurality of issues and the one or more parameters related to the previous application of the solution on the respective issue. The one or more parameters may comprise accuracy level, response time, and computational resource requirement of the respective solution.

In an embodiment of the present disclosure, the extraction of one or more standalone solutions may comprise matching each of the identified at least one issue with the plurality of issues stored in the repository. If the identified at least one issue matches with one of the plurality of issues, the one or more solutions mapped with the at least one issue may be extracted from the repository. If the identified at least one issue does not match with one of the plurality of issues, an alert may be generated for a system administrator or an IT technician. The alert may be used to indicate that the at least one issue is not present in the repository. The system administrator may then fix the at least one issue through manual intervention.

At block 205, a combination of solutions may be created from the extracted one or more standalone solutions for each of the respective identified at least one issue. The combination of solutions may be created based on the one or more parameters related to the previous application of the solution on the respective issue. The one or more parameters may define an intent for each of the respective solution. The one or more combinations of solutions are created from the extracted one or more standalone solutions based on highest probability of solving the at least one issue. The combination of solutions depends on the type of issue, whether it is standalone issue which needs multiple solutions to be clubbed together to ensure 100% troubleshooting or even close to that. The combination of solutions may also refer to combination of solution to solve multi-level issues/multi-dimensional issues which require more than one solution to troubleshoot it completely or close to 100%.

In one non-limiting embodiment of the present disclosure, the combination of solutions may be created in three stages after the identification of the issue:

Stage 1: A similarity score may be generated using the Cosine similarity to identify the similarity between issue tags associate with the identified issues and the solution tags associated with corresponding solutions.

Stage 2—The solutions from Stage 1 may be fed to a neural network model to classify the actions. Actions are the steps which may be executed to solve the issue. The neural network model may give the desired actions to be executed with the accuracy score based on the training. The neural network model may be trained to determine the accuracy score based on the actions to be executed for the issue. The data from Stage 1 & Stage 2 may be fed on to Stage 3.

Stage 3—The execution time of the actions may be captured in a Multi Directional Truepath Discovery (MDTD) response timings table. The summation of Stage1 and Stage2 divided by the summation of response time actions may result in MDTD score.

At block 207, a Multi Directional Truepath Discovery (MDTD) score is computed for each of the extracted one or more standalone solutions and combinations of solutions. The MDTD score may be used to rank the one or more standalone solutions and combinations thereof, where the highest score is ranked first, and the lowest score is ranked last.

In an embodiment of the present disclosure, the Multi Directional Truepath Discovery (MDTD) score may be generated at least based on group comprising of accuracy of the estimated solution(s), response time required to run the solution(s). In one non-limiting embodiment, the MDTD score may be generated based on the intent tags. The intent tags may be generated based on type of issue (#ISSUETAGS) and solution(s) present in the repository (#REPOTAGS). The combination of solutions may be generated based on the tags for solving a particular issue.

The system generates intent tags based on Issues (#ISSUETAGS) identified by the system and the solutions being read from repositories (#REPOTAGS). Thus, the tags generated may comprise #ISSUETAGS and #REPOTAGS. Tags may help in defining the intent of the issue as well as the intent of the solution present in the repository. The #ISSUETAGS may be then used to calculate the similarity with #REPOTAGS using the Pythagoras. The Pythagoras results in magnitude vector which is a score of pattern similarity between the TAGS generated. The [#TAGSCORE+Accuracy]/Response Time (average)--> (SET1) will result in MDTD score. The system assigns a MDTD score based on the SET1. The highest MDTD score will be marked for such issue types to remediate.

In an embodiment of the present disclosure, the MDTD scoring may comprise following stages:

Stage 1: Layer(TAG): In Layer(TAG) or ly (tag) the system may generate similarity score between issue and the solutions.

Step1: The identified issue may be locked in the system.

Step2: Based on issue, the system may extract the relevant solution(s) from the repository.

Step3: The system may access the deployed solutions inside the repository and then generate a term frequency-inverse document frequency (TF-IDF) scores for all the deployed solutions. The TF-IDF may be generated as follows.

$$TF\text{-}IDF = tf(t,d) * idf(t,D)$$

$$tf(t,d) = f(t)/\max f(w) \quad (1)$$

$$idf(t,D) = \ln(|D|/|d \in D : t \in d|) \quad (2)$$

$$TF\text{-}IDF = f(t)/\max f(w) * \ln(|D|/|d \in D : t \in d|) \quad (3)$$

$$TF\text{-}IDF = f(t)/\max f(w) * \ln(|D|/|d \in D : t \in d|) \quad (4)$$

$f(t)$=frequency of solution term $t$ in solution document $d$ $D$=solution documents Step4: The system may then generate the cosine similarity score for the issue locked against the solutions available from the repositories.

$$\cos(\theta) = (issue \cdot sol)/\|issue\|\|sol\| = y = \Sigma(i=1 \ldots n)issue_i * Sol_i/(\sqrt{\Sigma}(i=1 \ldots n)Issue^2_i * \sqrt{\Sigma}(i=1 \ldots n)Sol^2_i *) \quad (5)$$

The locked issue versus the solution similarity may generate a cos value. The solutions with the highest cos value may be feed to a neural network trained model. The trained model may in turn classify the correct respective steps or actions which must be triggered to remediate the issues.

In an embodiment of the present disclosure, neural network inputs may operate on the following formulas:
Stage 2: Layer(NN)—Neural network inputs(formula):

$$h_t = f(h_{(t-1)}, X_t) \quad (A)$$

$$h_t = \tanh(Whhh(t-1) + Wxh\ Xt) \quad (B)$$

$$Y_t = Why\ ht \quad (C)$$

Section A(formula): The desired solutions are passed through the neural network layer to get the desired action triggers. The solutions which are to be passed into neural network are considered as neuron coming into the system. The neurons are passed into hidden layer, which applies the formula to get the current state.

Section A:

$$h_t = f(h_{(t-1)}, X_t) \quad (A)$$

where $h_t$=new state of the input, $h_{t-1}$=previous state of the input, and $X_t$=input to the neural network at time t.

Section B:

$$h_t = \tanh(W_{hh} h_{(t-1)} + W_{xh} X_t) \quad (B)$$

where $h_t$=new state of the input, tanh=activation function, $W_{hh}$=input weights, and $W_{xh}$=input.

Section C:

$$Y_t = W_{hy} h_t \quad (C)$$

The current state from section B may be fed to calculate the output Y(t). The Y(t) output will result in the respective solution steps to be executed with an accuracy score.
The scores from Layer (TAG) and Layer (NN) may be considered to generate the MDTD score. The below table shows the response score to be applied to the generated score to get the MDTD score for all suitable solutions considered.
Stage 3: Layer(MDTD): Multi Directional TruePath Discovery The MDTD score generated inputs from layer(Tag) and layer(NN) that results in a score which may be then be fed into Layer(MDTD), the output score from Layer(MDTD) considering the response score, will then generate an output which can be used to arrange and trigger the actions to remediate the issue.

$$MDTD = (\Sigma(i=1 \ldots n) ly(tag)_i \cdot ly(nn)_1)/(\sqrt{\Sigma}(i=1 \ldots n)\text{Response Score})\Sigma(i=1 \ldots n) ly(tag)_i \cdot ly(nn)_i = ly(tag)_1 \cdot ly(nn)_1 + ly(tag)2 \cdot ly(nn)_2 + \ldots + ly(tag)_n \cdot ly(nn)_n \sqrt{\Sigma}(i=1 \ldots n)\text{Response Score} = \text{Rescore}_1 + \text{Rescore}_2 + \ldots + \text{Rescore}_n$$

$$MDTD = (ly(tag)_1 \cdot ly(nn)_1 + ly(tag)2 \cdot ly(nn)_2 + \ldots + ly(tag)_n \cdot ly(nn)_n)/(\sqrt{\Sigma}(i=1 \ldots n)\text{Response Score})$$

However, the MDTD score calculation method is not limited to above exemplary embodiment and any other MDTD score calculation method is well within the scope of the present disclosure.

In one exemplary embodiment of the present disclosure, the MDTD score calculation method may be understood using the following example:
Stage 1:
 1. Issue I1 occurs in the IT environment for ex:—a network issue.
 2. Solutions repository has multiple solutions like: Sol1, Sol2, Sol3 . . . , Soln.
 3. Now the Issue I1 and the respective Solutions will pass through Stage 1 to give cosine score. The score always lies between 0 to 1.
 4. The solutions for which the cosine scores which are near to 1, those solutions will be passed to Stage 2.
 5. Based on point 4, the output from stage 1 will be as shown in table 1 below.

| Stage1 – Cosine Layer | Cosine Score |
| --- | --- |
| Issue 1 + Sol3 | 0.9 |
| Issue 1 + Sol9 | 0.86 |
| Issue 1 + Sol37 | 0.78 |

The above solutions (Sol3, Sol9, Sol37) have the highest similarity scores as against Issue(I1), thus they will now be considered for Stage 2.
Stage 2:
 6. In Stage 2 the solutions from Stage 1 will be passed to neural network trained model which will give the relevant steps for the given remediation solutions with an accuracy score as shown in table 2 below.

| Stage2 – Neural Network Layer | Accuracy Score |
| --- | --- |
| Sol3(Execution Steps) | 0.87 |
| Sol9(Execution Steps) | 0.93 |
| Sol37(Execution Steps) | 0.85 |

7. The scores from Stage 1(Cosine Score) and Stage 2(Accuracy Score) may be then passed onto Stage 3.
Stage 3:
 8. Normally the response score for various solutions are recorded and maintained already based on previous executions. In this example case, now these 3 solutions Sol3, Sol9, Sol37 will be considered to get their execution time from below referenced table (point 9).
  8.1 Sol3 takes 8 sec to execute
  8.2 Sol9 takes 13 sec to execute
  8.3 Sol37 takes 32 sec to execute
 9. Average Response Time Score may be as shown in table 3 below:

| Response Time | Response Score |
| --- | --- |
| 0-10 sec | .1 |
| 11-20 sec | .2 |
| 21-30 sec | .3 |
| 31-40 sec | .4 |
| 41-50 sec | .5 |
| 51-60 sec | .6 |
| 61-70 sec | .7 |
| 71-80 sec | .8 |
| 81-90 sec | .9 |
| >91 sec | 1 |

10. In Stage 3, MDTD score may be calculated using the mentioned formula which will do a summation of cosine score and the accuracy score to generate the numerator. Similarly, the summation of solutions response time shown in table 3 above(Response Time Score) may be considered for calculating the denominator. Thus, the calculations in Stage 3 will be shown in table 4:

| Solutions | Cosine Score(Stage1) | Accuracy Score(Stage2) | Summation |
|---|---|---|---|
| Sol3 | 0.9 | 0.87 | 0.9 * 0.87 = 0.783 |
| Sol9 | 0.86 | 0.93 | 0.86 * 0.93 = 0.799 |
| Sol37 | 0.78 | 0.85 | 0.78 * 0.85 = 0.663 |
| | Total MDTD score | | 2.24/0.83 = 2.69 |

10.1: Formula based on Stage 3

$\Sigma(i=1 \ldots n) ly(tag)_i \cdot ly(nn)_i = [0.9 \cdot 0.87 + 0.86 \cdot 0.93 + 0.78 \cdot 0.85] = [0.783 + 0.799 + 0.663] = 2.24$ (numerator)

Based on point 8.1, 8.2 and 8.3 the respective response scores will be considered from point 9.

10.2: Formula based on Stage 3

$\sqrt{\Sigma}(i=1 \ldots n)$Response Score$=[0.1+0.2+0.4]=\mathrm{sqrt}(0.7)=0.83$ (denominator)

10.3: MDTD Score $\mathrm{MDTD} = (ly(tag)_1 \cdot ly(nn)_1 + ly(tag)2 \cdot ly(nn)_2 + \ldots + ly(tag)_n \cdot ly(nn)_n)/(\sqrt{\Sigma}(i=1 \ldots n)\text{Response Score})$ Thus, using the above formula, we get =2.24/0.83=2.69 MDTD score.

Thus 2.69 MDTD score has been generated for combination of solutions (Sol3, Sol9, Sol37).

11. Thus, different combination of solutions will be used to generate the different MDTD scores. (as shown in Table 5 below).

Table 5 shows MDTD score comparison for a plurality of combination of solutions for Issue (I1), in accordance with an exemplary embodiment of the present disclosure.

TABLE 5

Example of MDTD Score Table for Issue(I1)

| Solutions | #REPOTAGS(Solutions) | #ISSUETAGS(Issue) | MDTD Score |
|---|---|---|---|
| Sol3 + Sol9 + Sol37 | #AW #BRE #CW | #D09S #G65D #U82T | 2.69 |
| Sol2 + Sol7 + Sol5 | #PWQ #QD #RO | #D092G #J21U #R43E | 1.83 |
| Sol1 + Sol8 + Sol2 + Sol24 | #HDF #GS #DP | #F54R #P76D #H32R #J32T | 2.31 |
| Sol4 + Sol1 + Sol7 + Sol5 | #UDD #TA #GL | #IR56 #H67A #JD762 | 0.97 |
| Sol5 + Sol3 + Sol8 | #HGF #PA #ST | #LO87 #PQ93 #XI34 | 1.43 |
| Sol6 + Sol1 | #LB #XA #LS | #HG54 #AP32 #JH32 | 0.77 |
| Sol7 + Sol2 + Sol4 | #WWQ #TG #ID #FJDF #KJYD | #PW65 #GF76 #DS43 #KX76 | 1.16 |
| Sol8 + Sol1 + Sol3 | #UGF #WH #DS | #KQ54 #PS54 #MR543 | 1.96 |

In the above example, the system runs a combination of solutions for a given issue(I1). The standalone solution or combination of solution with the highest MDTD score will be the more relevant and accurate solution in fixing the Issue(I1). Once the issue(I1) gets resolved with the solutions standalone solution or combination of solution having the highest MDTD score, the respective solution combination will be saved against such issue(I1) and will be used in the future for such similar set of issues.

However, the MDTD score calculation method is not limited to above exemplary embodiment and any other MDTD score calculation method is well within the scope of the present disclosure.

At block 209, for each of the respective identified at least one issue, either a standalone solution or a combination of solutions may be selected based on highest MDTD score. The selected solution(s) may have the highest MDTD score. Table 5 indicates (Sol3+Sol9+Sol37) has the highest MDTD score of 2.69. The system may select the combination (Sol3+Sol9+Sol37) for the identified issue.

At block 211, the selected standalone solution or combination of solutions is implemented on the each of the respective at least one issue for resolution. The implementation may comprise executing the solution scripts associated with the respective selected standalone solution or combination of solutions on the system of a user, where a corresponding issue is identified. The implementation of selected standalone solution or combination of solutions on each of the respective at least one issue may lead to maximum resolution of the issue. The system may update the repository based on the implementation of the selected standalone solution or combination of solutions.

In one non-limiting embodiment of the present disclosure, the system may implement a deep learning technique to learn from previous implementation of solutions and the system may only create combination of solutions having a MDTD score greater than a pre-determined threshold. In another embodiment of the present disclosure, the steps of method 200 may be performed in an order different from the order described above.

Figure 3A:
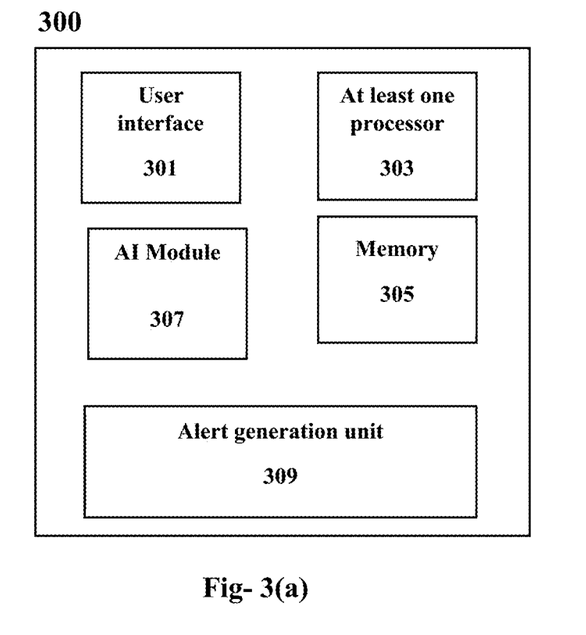
FIG. 3(a) shows a block diagram illustrating a system for solving an issue in an infrastructure and FIG. 3(b) show a block diagram illustrating an AI module, in accordance with an embodiment of the present disclosure.
Figure 3B:
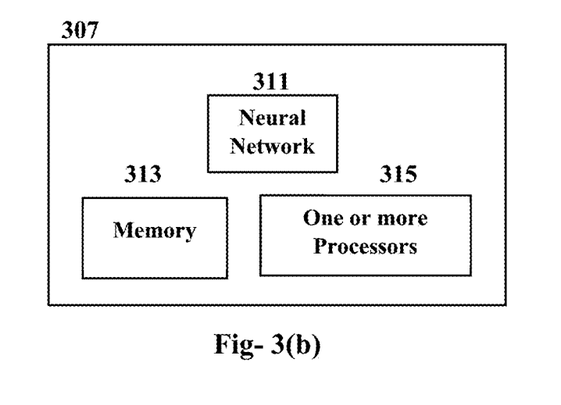

FIG. 3(a) shows a block diagram illustrating a system for solving an issue in an infrastructure and FIG. 3(b) show a block diagram illustrating an AI module, in accordance with an embodiment of the present disclosure.

In an embodiment of the present disclosure, a system 300 may comprise a user interface 301, at least one processor 303, an AI module 307, memory 305, and an alert generation unit 309 in communication with each other. The user interface 301 may be configured to store a plurality of pre-identified issues along with corresponding one or more solution for solving each of the plurality of pre-identified issues in the repository of memory 305.

The at least one processor 303 may be configured to store and identify at least one issue based on monitoring of the infrastructure. To monitor the infrastructure the at least one processor 303 may be configured to monitor various elements present within an IT infrastructure. The identified at least one issue may be classified based on IT specific domains. The IT specific domains may comprise such network management, database management, hardware management, software management, etc. However, the IT specific domains are not limited to above examples and any other domain within the IT infrastructure is well within the scope of the present disclosure.

The at least one processor 303 may be then configured to extract, one or more standalone solutions related to each of the identified at least one issue from a repository stored in the memory 305. Each of the one or more solutions may comprise a solution script to be executed to solve a respective issue and the one or more parameters related to the previous application of the solution on the respective issue. The one or more parameters may comprise accuracy, response time, and computational resource requirement of the respective solution.

To extract one or more standalone solutions, the at least one processor 303 may be configured to match each of the identified at least one issue with the plurality of issues stored in the repository. If the identified at least one issue matches with one of the plurality of issues, the at least one processor 303 may be configured to extract the one or more standalone solutions mapped with the at least one issue from the repository. If the identified at least one issue does not match with one of the plurality of issues, the at least one processor 303 may be configured to generate an alert for a system administrator using the alert generation unit 309. The alert may be used to indicate that the at least one issue is not present in the repository. The system administrator may then fix the at least one issue through manual intervention.

The at least one processor 303 may be then configured to create combination of solutions from the extracted one or more standalone solutions, for each of the respective identified at least one issue. The combination of solutions may be generated based on the one or more parameters related to the previous application of the solution on the respective issue. The one or more parameters may define an intent for each of the respective solution. To create one or more combinations of solutions from the extracted one or more standalone solutions, the at least one processor 303 may configured to create one or more combinations of solutions from the extracted one or more standalone solutions based on highest probability of solving the at least one issue.

The at least one processor 303 may be then configured to compute Multi Directional Truepath Discovery (MDTD) score for each of the extracted one or more standalone solutions and each of the created combination of solutions. The MDTD score may be used to rank the one or more standalone solutions and each of the created combination of solutions based on the MDTD score as discussed above.

In one non-limiting embodiment of the present disclosure, the AI module 307 may comprise one or more processors 315, a neural network 311, and a memory 313 in communication with each other. The AI module 307 may be configured to create combination of solutions from the extracted one or more standalone solutions, for each of the respective identified at least one issue and compute Multi Directional Truepath Discovery (MDTD) score for each of the extracted one or more solutions and combinations thereof. The MDTD score may be calculated based on the procedure as mentioned above.

The at least one processor 303 may be then configured to select either a standalone solution or a combination of solution based on ranking of MDTD score, for each of the respective identified at least one issue, and implement the selected solution(s) on each of respective at least one issue. The implementation of selected solution(s) on each of the respective at least one issue may lead to maximum resolution of the issue. The at least one processor 303 may be configured to update the repository based on the implementation of the selected standalone solution or combination of solutions. In one non-limiting embodiment of the present disclosure, the AI module may be configured to apply deep learning method to learn from previous implementation of solutions and the AI module may only create combination of solutions having a MDTD score greater than a pre-determined threshold.

Figure 4A:
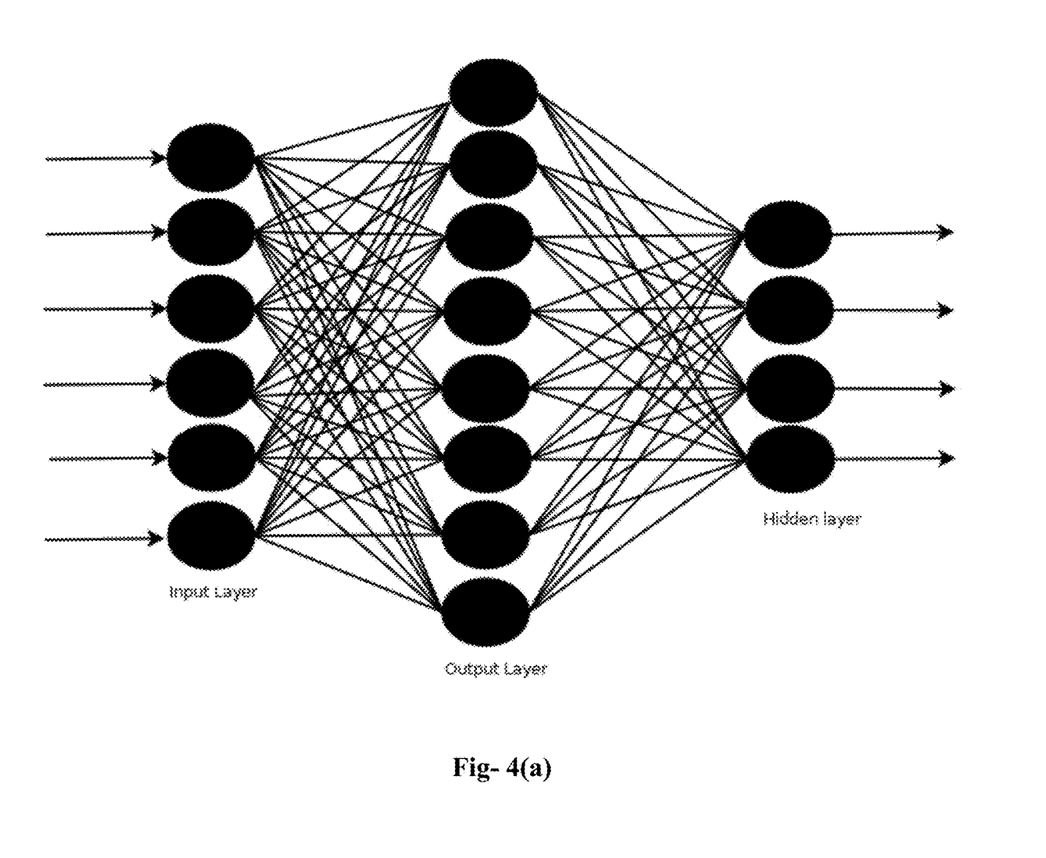
FIG. 4(a) shows an exemplary neural network layers for solving an issue in an infrastructure, in accordance with an embodiment of the present disclosure.

FIG. 4(*a*) shows an exemplary neural network layers for solving an issue in an infrastructure, in accordance with an embodiment of the present disclosure.

In an embodiment of the present invention, the method 200 may comprise a deep learning methods such as recurrent neural network (RNN) to understand the automation solutions stored as action responses in the system 300. The method 200 may determine the most accurate action response to remediate the IT issue. The automation solutions defined in the repository may be fed to neural network model as shown in FIG. 4(*a*). The neural network layers may classify the correct actions to be triggered for the issue resolution. Using neural network for solution classification involves continuously learning from the previous application of the solution on the respective issue.

The neural network takes issue data and the response action as input and then encodes the data using one hot encoder. The input neuron may transform the input data into hidden data then calculates weights and gets the context from the data, the context is then fed to another input layer which again calculates the weights based on context from previous learnings and recreates the context for the input. Thus, the inputs flow through the various channels of hidden layers.

During the flow of inputs between layers RNN exhibits the vanishing gradient problem, where the gradients update the neural network weights. To overcome the vanishing gradient problem, RNN uses the Long Short Term Memory (LSTM).

Figure 4B:
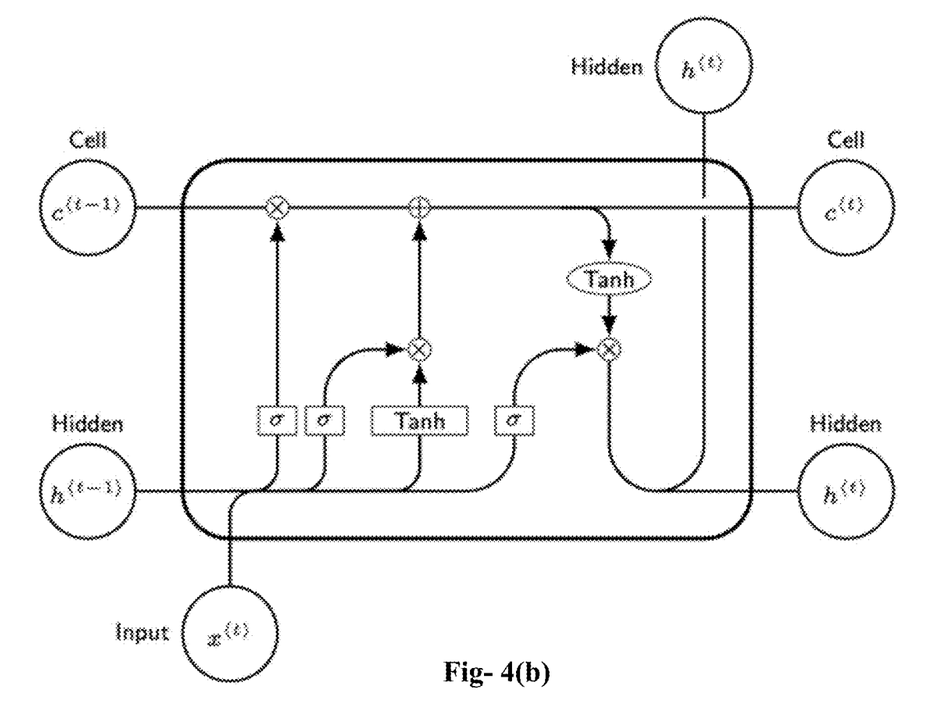
FIG. 4(b) illustrates an exemplary long short term memory (LSTM) approach, in accordance with an embodiment of the present disclosure.

FIG. 4(*b*) illustrates an exemplary long short term memory (LSTM) approach, in accordance with an embodiment of the present disclosure.

The LSTM in RNN combines the new value and the data from previous node. The combined data is then fed to activation function where it decides whether the forget value should be open, closed or open to certain extent. The same combined value in parallel is also fed to the tanh operation layer where it decides what has to be passed to the memory pipeline which will become the output to the module. Thus, with the RNN-LSTM approach in place, the system classifies the solutions for the actionable IT issues. The identified solutions may be fed as an input to second processing layer for finding the optimal combinations of solutions. The combined solutions set may be applied to resolve the issue more optimally. The optimal solutions set is identified at the second processor layer using MDTD (Multi Directional Truepath Discovery) method as discussed above. In one non-limiting embodiment of the present disclosure, the RNN may apply or implement a deep learning technique to learn from previous implementation of solutions and the system may only create combination of solutions having a MDTD score greater than a pre-determined threshold.

Figure 4C:
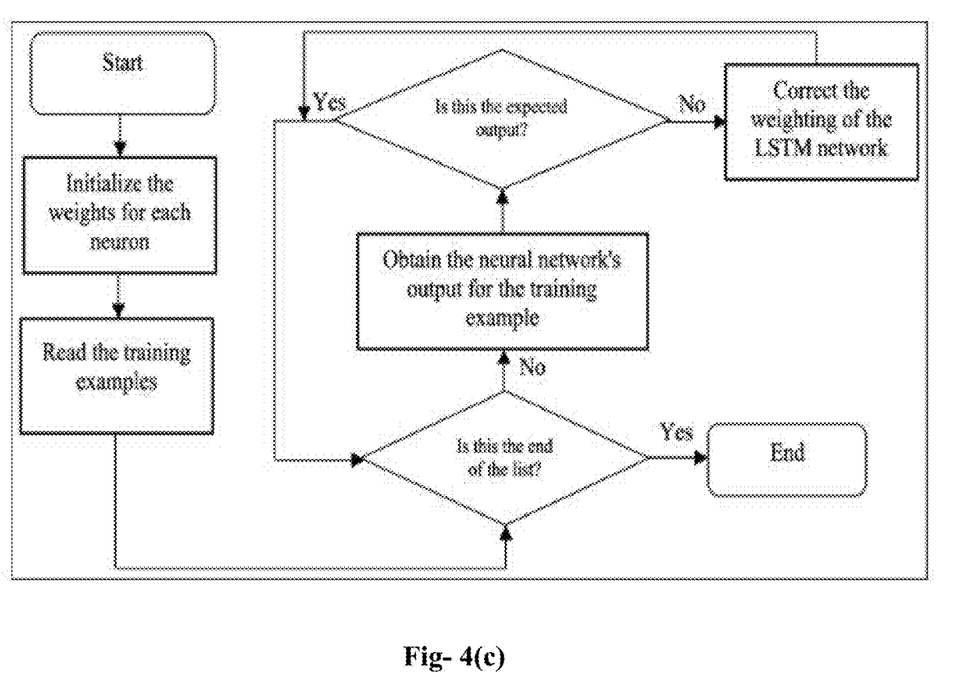
FIG. 4(c) shows a flowchart illustrating the weight updates flowing between the layers, in accordance with an embodiment of the present disclosure.

FIG. 4(c) shows a flowchart illustrating the weight updates flowing between the layers of the neural network, in accordance with an embodiment of the present disclosure.

In an embodiment of the present disclosure, weights may be initialized for each of the neurons of the LSTM neural network by the one or more processors 315 of the AI module 307. The one or more processors 315 may be then configured to read the training examples and obtain the neural network output for each of the training example. The training examples may comprise one or more pre-identified issues along with respective one or more solutions.

If the neural network output is less than predetermined threshold value, the one or more processors 315 may be configured to update the weights for each of the neurons of the LSTM neural network. The process of updating the weights for each of the neuron may continue till the neural network output becomes greater than predetermined threshold value.

The user interface 301 may include at least one of a key input means, such as a keyboard or keypad, a touch input means, such as a touch sensor or touchpad, and the user interface may include a gesture input means. Further, the interface unit 301 may include all types of input means that are currently in development or are to be developed in the future. The user interface 301 may receive information from the user through the touch panel of the display and transfer at least one processor 303 and AI module 307.

The at least one processor 303 may comprise a memory and communication interface. The memory may be software maintained and/or organized in loadable code segments, modules, applications, programs, etc., which may be referred to herein as software modules. Each of the software modules may include instructions and data that, when installed or loaded on a processor and executed by the processor, contribute to a run-time image that controls the operation of the processors. When executed, certain instructions may cause the processor to perform functions in accordance with certain methods, algorithms and processes described herein.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

Suitable processors include, by way of example, a processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Exemplary embodiments discussed above may provide certain advantages. Though not required to practice aspects of the disclosure, these advantages may include those provided by the following features.

In an embodiment, the present disclosure provides an autonomous system that enables self-heal capability of the system to fix normally occurring different issue types in the IT environment.

In an embodiment, the present disclosure provides a neural network based cognitive memory learning model to relearn and find a most relevant automation solution from the automation solution repository for an issue.

Reference Numbers:

| Reference Number | Description |
| --- | --- |
| 100 | ENVIRONMENT |
| 200 | METHOD |
| 300 | SYSTEM |
| 301 | USER INTERFACE |
| 303 | AT LEAST ONE PROCESSOR |
| 305 | MEMORY |
| 307 | AI MODULE |
| 309 | ALERT GENERATION UNIT |
| 311 | NEURAL NETWORK |
| 313 | MEMORY |
| 315 | ONE OR MORE PROCESSORS |

We claim:

1. A method of solving an issue in an Information technology (IT) infrastructure, the method comprising:
    identifying at least one issue based on monitoring of the IT infrastructure;
    extracting one or more standalone solutions corresponding to one or more previously identified issues related to the identified at least one issue from a repository, wherein the one or more standalone solutions are extracted when characteristics of the at least one issue is matched with characteristics of the one or more previously identified issues of a plurality of issues stored in the repository, and wherein the characteristics indicate a type of issue determined using ISSUETAGS;
    for each of the identified at least one issue,
        creating a solution or combination of solutions from the extracted one or more standalone solutions based on one or more parameters related to the one or more previously identified issues substantially similar to the identified at least one issue,
        simulating each script, mapped to the solution or combination of solutions, for the identified at least one issue to resolve the issue, wherein the simulation includes execution of action steps as prescribed for each script, computing, upon execution of each script, Multi Directional Truepath Discovery (MDTD) score for each solution or combination of solutions, wherein the MDTD score is computed by, computing a similarity score, using a cosine similarity, to determine a similarity between the at least one issue and a set of solutions present in the repository, wherein the similarity score is computed using a Term Frequency-Inverse Document Frequency (TF-IDF), extracting one or more standalone solutions, from the set of solutions, having highest similarity score, feeding actions, as scripted in each of the extracted one or more standalone solutions, to a neural network model, wherein the neural network model computes an accuracy score for each of the extracted one or more standalone solutions upon execution of actions for the at least one issue, and computing the MDTD score for each of the extracted one or more standalone solutions based on a summation of the corresponding similarity score and accuracy score reciprocated by a response time indicating an execution time of the actions performed by the neural network model to resolve the at least one issue, and selecting either a standalone solution or a combination of solutions having a highest MDTD score; and implementing the selected standalone solution or combination of solutions, wherein implementation of the selected standalone solution or combination of solutions enables solving the issue in the IT infrastructure closer to 100 percent with optimal utilization of computing resources.

2. The method as claimed in claim 1, further comprising: storing a plurality of issues along with one or more standalone solutions in the repository.

3. The method as claimed in claim 1, wherein the MDTD score is determined based on one or more parameters associated with each of the standalone solution, and wherein the one or more parameters is selected from a group comprising computation resource required, accuracy level, and response time.

4. The method of claim 1, wherein creating one or more combinations of solutions from the extracted one or more standalone solutions comprises:

ranking each standalone solution or a combination of solutions, of the one or more standalone solutions, in descending order based on the MDTD score computed for each of the extracted one or more standalone solutions, wherein a standalone solution or a combination of solutions having highest score is ranked first, and creating one or more combinations of solutions from the extracted one or more standalone solutions based on highest probability of solving the at least one issue.

5. The method as claimed in claim 1, further comprising: updating the repository based on the implementation of the selected standalone solution or combination of solutions.

6. The method as claimed in claim 1, wherein extracting one or more standalone solutions comprises:

matching each of the identified at least one issue with the plurality of issues stored in the repository;

if the identified at least one issue matches with one of the plurality of issues, extracting the one or more standalone solutions mapped with the at least one issue; and if the identified at least one issue does not match with one of the plurality of issues, generating an alert for a system administrator.

7. A system for solving an issue in an Information technology (IT) infrastructure, the system comprising:

a memory;

at least one processor in communication with the memory and configured to:

identify at least one issue based on monitoring of the IT infrastructure;

extract one or more standalone solutions corresponding to one or more previously identified issues related to the identified at least one issue from a repository stored in the memory, wherein the one or more standalone solutions are extracted when characteristics of the at least one issue is matched with characteristics of the one or more previously identified issues of a plurality of issues stored in the repository, and wherein the characteristics indicate a type of issue determined using ISSUETAGS;

for each of the identified at least one, create a solution or combination of solutions from the extracted one or more standalone solutions based on one or more parameters related to the one or more previously identified issues substantially similar to the identified at least one issue, simulating each script, mapped to the solution or the combination of solutions, for the identified at least one issue to resolve the issue, wherein the simulation includes execution of action steps as prescribed for each script;

compute, upon execution of each script, Multi Directional Truepath Discovery (MDTD) score for each solution or combination of solutions, wherein the MDTD score is computed by, computing a similarity score, using a cosine similarity, to determine a similarity between the at least one issue and a set of solutions present in the repository, wherein the similarity score is computed using a Term Frequency-Inverse Document Frequency (TF-IDF), extracting one or more standalone solutions, from the set of solutions, having highest similarity score, feeding actions, as scripted in each of the extracted one or more standalone solutions, to a neural network model, wherein the neural network model computes an accuracy score for each of the extracted one or more standalone solutions upon execution of actions for the at least one issue, and computing the MDTD score for each of the extracted one or more standalone solutions based on a summation of the corresponding similarity score and accuracy score reciprocated by a response time indicating an execution time of the actions performed by the neural network model to resolve the at least one issue, and select either a standalone solution or a combination of solutions having a highest MDTD score; and implement the selected standalone solution or combination of solutions, wherein implementation of the selected standalone solution or combination of solutions enables solving the issue in the IT infrastructure closer to 100 percent with optimal utilization of computing resources.

8. The system as claimed in claim 7, wherein the at least one processor is further configured to:
  store a plurality of issues along with one or more standalone solutions in the repository.

9. The system as claimed in claim 7, wherein the at least one processor is configured to determine the MDTD score based on one or more parameters associated with each of the standalone solution, and wherein the one or more parameters is selected from a group comprising at least one of computation resource required, accuracy level, and response time.

10. The system as claimed in claim 7, wherein the at least one processor is further configured to:
  update the repository based on the implementation of the selected standalone solution or combination of solutions.

11. The system as claimed in claim 7, wherein to extract one or more standalone solutions, the at least one processor is configured to:
  match each of the identified at least one issue with the plurality of issues stored in the repository;
  if the identified at least one issue matches with one of the plurality of issues, extract the one or more standalone solutions mapped with the at least one issue; and
  if the identified at least one issue does not match with one of the plurality of issues, generate an alert for a system administrator.

12. The method as claimed in claim 1, wherein the accuracy score is computed based on the formulation $$Y_t = W_{hy} h_t,$$

wherein '$Y_t$' indicates the accuracy score, '$W_{hy}$' indicates weight for '$h_t$' indicating new state of the input, wherein '$h_t$' is computed based on either on formulation (1) or formulation (2), wherein formulation (1) is $f(h_{(t-1)}, X_t)$, and wherein '$h_{t-1}$' indicates previous state of the input and '$X_t$' indicates input to the neural network at time 't', and wherein formulation (2) is $\tanh(W_{hh} h_{(t-1)} + W_{xh} X_t)$, and wherein 'tanh' indicates an activation function, '$W_{hh}$' indicates input weights, and '$W_{xh}$' indicates an input.

13. The system as claimed in claim 7, wherein the accuracy score is computed based on the formulation $$Y_t = W_{hy} h_t,$$

wherein '$Y_t$' indicates the accuracy score, '$W_{hy}$' indicates weight for '$h_t$' indicating new state of the input, wherein '$h_t$' is computed based on either on formulation (1) or formulation (2), wherein formulation (1) is $f(h_{(t-1)}, X_t)$, and wherein '$h_{t-1}$' indicates previous state of the input and '$X_t$' indicates input to the neural network at time 't', and wherein formulation (2) is $\tanh(W_{hh} h_{(t-1)} + W_{xh} X_t)$, and wherein 'tanh' indicates an activation function, '$W_{hh}$' indicates input weights, and '$W_{xh}$' indicates an input.

* * * * *